G. L. SHANK.
SAFETY HANDHOLD.
APPLICATION FILED AUG. 19, 1915.
1,179,665.
Patented Apr. 18, 1916.
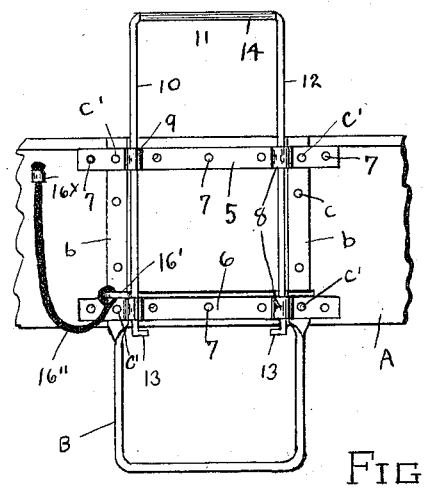
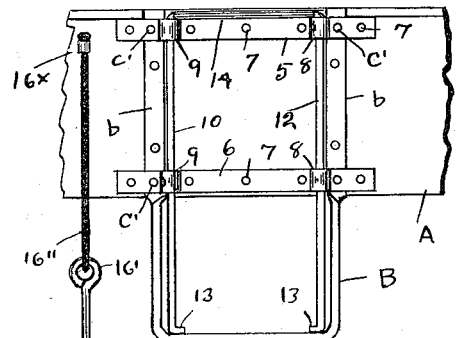
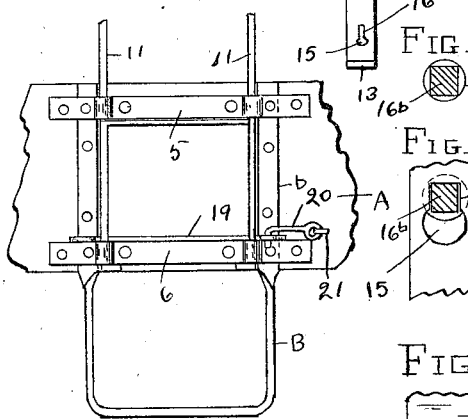
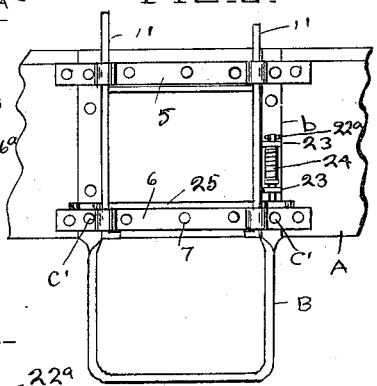
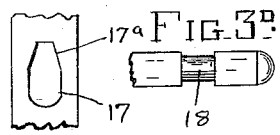
Inventor
G. L. SHANK
By Joseph J. O'Brien
Attorney

UNITED STATES PATENT OFFICE.

GEORGE L. SHANK, OF HINTON, WEST VIRGINIA.

SAFETY-HANDHOLD.

1,179,665.  Specification of Letters Patent. Patented Apr. 18, 1916.

Application filed August 19, 1915. Serial No. 46,242.

*To all whom it may concern:*

Be it known that I, GEORGE L. SHANK, a citizen of the United States, residing at Hinton, in the county of Summers and State of West Virginia, have invented certain new and useful Improvements in Safety-Handholds, of which the following is a specification.

This invention relates to improvements in hand holds for flat freight cars, and is designed to provide a device which can be raised by manual effort above the bed of the flat car to present a safe hand hold for the brakeman or other person working on the car.

The flat freight cars in present use are provided with hand holds which are located below the upper face of the bed of the flat car, and this arrangement is made necessary to load and unload the flat cars; the hand holds being located below the upper face of the bed so as to be out of the way. But owing to this construction it is impossible for a person positioned on the bed of a flat car to obtain a proper hold when the car is in motion, or to obtain a proper hand hold to mount or demount the car.

My invention relates to a device which can be manually raised above the bed of the flat car, and locked in its raised position, and which may be readily lowered below the bed, so as to be out of the way when the car is to be loaded or unloaded.

My invention is embodied in a construction which includes the usual U-shaped step member, and a hand hold which is slidably held against the side of the flat car and in line with the step member and arranged to be locked in its elevated position, by means of a manually set pin.

The invention also embraces novel means for locking the vertically slidable hand hold in its elevated position.

With the above and other objects in view the invention comprises certain new and useful combinations, constructions and arrangements of parts, clearly described in the following specification and fully illustrated in the accompanying drawing, in which:—

Figure 1 is a side elevation of a portion of a flat car, showing my improved hand hold in its elevated position. Fig. 2 is a similar view showing the hand hold in its lowered position. Fig. 3 is a detail view of the lower end of one of the side bars of the hand hold. Fig. 3$^A$ is a detail transverse sectional view of the locking pin. Fig. 3$^B$ is a detail view, partly in transverse section, showing the locking connection between the pin and the hand hold. Fig. 3$^C$ is a detail view of a modified form of the slot in the side bar of the hand hold. Fig. 3$^D$ is a detail view of a modified form of the locking pin. Fig. 4 is a side view showing a modified form of the locking means. Fig. 5 is a side view showing another modified form of the locking means. Fig. 6 is a detail view of the locking bolt shown in Fig. 5. Fig. 6$^A$ is a detail view of the end of the locking pin used in connection with the locking bolt shown in Figs. 5 and 6.

Referring to the accompanying drawings, which illustrate the practical embodiment of the invention, A designates a portion of the side sill and bed or floor of an ordinary flat car, to which the usual stirrup or step member B is secured by its hanger arms or bars *b* and the bolts or rivets *c*.

Two guiding members 5 and 6 are secured to the side of the flat car and across the hanger bars *b* by the bolts or rivets 7; one of the bolts or rivets *c'* used for holding the hanger bars *b* being also extended through the portion of each of said guiding members which contacts with the hanger bar *b*.

Each of the guiding members 5 and 6 is formed with outwardly disposed eyes 8 and 9, which are longitudinally spaced from each other; the eyes 8 being disposed in vertical alinement with each other and the eyes 9 being likewise disposed.

The side bar 10 of the inverted U-shaped hand hold 11 is slidably held by the eyes 9, and the parallel side bar 12 of said hand hold is slidably held by the eyes 8, against the side of the flat car. The side bars are formed with terminal stops 13, which are adapted to abut against the lower guiding member 6, and thus prevent further upward movement of the hand hold. The side bars 10 and 11 are rigidly connected to each other by the handle bar 14, which is preferably rounded to neatly fit the hand of the operator.

The lower portion of each side bar of the hand hold is formed with an opening 15 through which the locking pin 16 is adapted to be passed. The body of the locking pin is rounded, but said locking pin is formed with a squared portion 16$^a$, which is adapted to lockingly engage the square portion 16$^b$, formed in each of the side bars. The hand hold is first raised so that the terminal stops 13 will abut against the lower guide 6 and then the locking pin is extended through the openings 15 and the hand hold is allowed to drop by gravity, thus locking the squared portion 16$^a$ of the locking pin 16 in the squared portion 16$^b$ of the side bar; and thus preventing the displacement of the locking pin and the accidental dropping of the hand hold.

The side bar may be formed with a slot like that shown in Fig. 3$^c$, the lower portion 17 of which is rounded and provided with parallel sides, and the upper portion 17$^a$ of which is formed with upwardly converging sides; and the locking pin may be formed with a rounded reduced portion 18, shown in Fig. 3$^D$, whereby the locking pin may be locked in the slot 17$^a$.

In Fig. 4 I show a modified form of the locking means, wherein the locking pin 19 is formed with an opening or eye to receive the angular end of the hook 20, which is secured to the side of the car by the screw eye 21.

The locking pin 16 is provided with a terminal eye 16′ to which the covered chain or holding device 16″ is secured, the chain or device 16″ being held in place on the side of the car by the fastening device 16$^x$. In Figs. 4 and 5 I have omitted the showing of the holding chain or device, to show that the use of said device may be dispensed with, if desired.

In Figs. 5, 6 and 6$^A$ I show a locking bolt 22 which is slidably held in lugs 23, secured to or formed on the hanger bar $b$. The bolt 22 is formed with a beveled lower end and is provided on its upper end with a cross pin 22$^a$, whereby the same may be readily raised. Intermediate of its ends the bolt 22 is provided with a shoulder or stop 22$^b$, against which the lower end of the spring 24 bears, the upper end of said spring bearing against the upper lug 23 fastened to bar 7. In this way the bolt 22 is under tension from the spring 24, so that when the locking pin 25 is extended through the side bars 11 the lower end of the bolt will spring into the opening 25$^a$ formed in said locking pin, thereby holding the same against displacement.

In the four forms of the locking means shown I have illustrated variations of lock, comprising a female and a male part, or companion locking elements, one of which is adapted to interlock with the other by an interfitting connection.

Having described my invention I claim and desire to secure by Letters Patent:—

1. A disappearing hand hold for flat cars, comprising a guide attachable to the side of a flat car, a hand hold slidable on the guide, and means for locking the hand hold in elevated position on the guide.

2. A safety hand hold for flat cars comprising a member having a handle, means for slidably securing the member to the side of a flat car and means for locking the member to said means to support said handle above the bed of the flat car.

3. A safety hand hold comprising a member having a handle and side bars, means for slidably securing the side bars to the side of a car, and means for locking said side bars to said securing means to hold the member in elevated position.

4. A safety hand hold for flat cars, consisting of a guide having companion eyes and adapted to be secured to the side of a flat car, a member having side bars slidable in said eyes and having a connecting handle bar, and a device for locking said side bars to said guide to hold said handle bar in elevated position.

5. A safety hand hold for flat cars consisting of a guide having companion eyes and adapted to be secured to the side of a flat car, a member having a handle bar and side bars depending therefrom, said side bars being slidable in said eyes, and a locking pin slidable through said side bars and adapted to be locked to said side bars to hold the handle bar elevated.

6. A safety hand hold for flat cars consisting of companion guiding members attachable to the side of a flat car, an inverted U-shaped member slidable on said guides, and a cross pin for locking said member in elevated position to said guides.

7. A safety hand hold consisting of companion guides, an inverted U-shaped member slidable on said guides, said guides having side bars formed with slots or openings, and a cross pin insertible in said slots or openings and having shoulders thereon adapted to lock with the side bars to hold said pin against displacement.

8. A safety hand hold consisting of companion guides, an inverted U-shaped member slidable on said guides, said guides having side bars provided with openings therein, a cross pin insertible in said openings, and means formed on said cross pin and on said side bars for interlocking said pin to said side bars to prevent the displacement of said pin.

9. A safety hand hold consisting of companion guides, an inverted U-shaped member slidable on said guides, said guides having side bars provided with openings, said openings having squared portions, and a locking pin slidable through said openings and having a squared portion to interlock with the squared portion of one of said openings.

10. A safety hand hold consisting of companion guides, an inverted U-shaped hand hold slidable on said guides, and a gravity locking connection for holding said hand hold elevated.

In testimony whereof I affix my signature.

GEORGE L. SHANK.

Witness:
CHAS. F. LITTLEPAGE.

Copies of this patent may be obtained for five cents each, by addressing the "Commissioner of Patents, Washington, D. C."